UNITED STATES PATENT OFFICE.

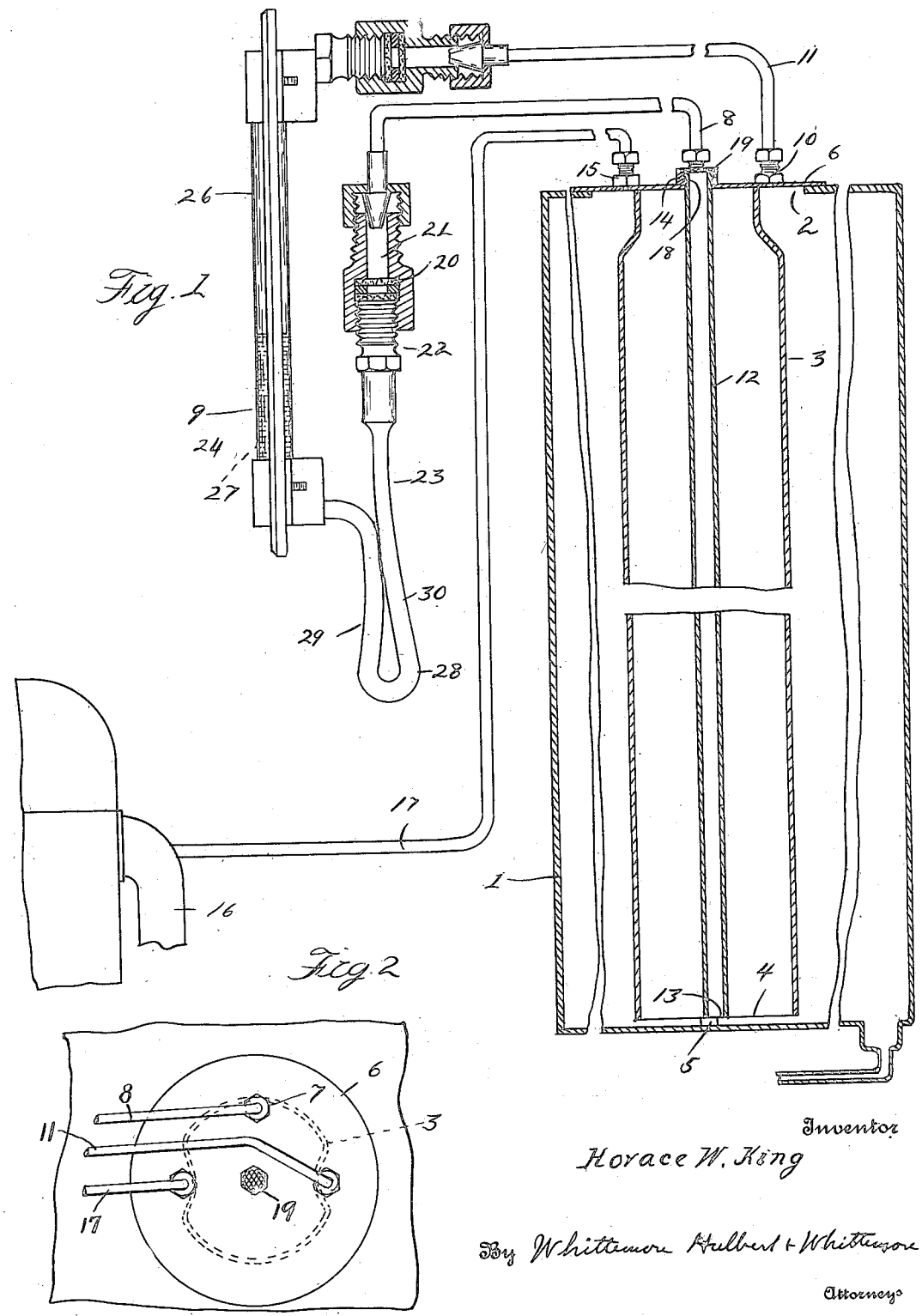

HORACE W. KING, OF ANN ARBOR, MICHIGAN.

DEPTH-INDICATING DEVICE.

1,419,388. Specification of Letters Patent. Patented June 13, 1922.

Application filed August 22, 1919. Serial No. 319,076.

*To all whom it may concern:*

Be it known that I, HORACE W. KING, a citizen of the United States of America, residing at Ann Arbor, in the county of Washtenaw and State of Michigan, have invented certain new and useful Improvements in Depth-Indicating Devices, of which the following is a specification, reference being had therein to the accompanying drawing.

The invention relates to devices for indicating the depth of liquids and is particularly applicable in devices in which liquid is drawn from a tank by means of vacuum, but the invention is also adapted to be used in devices in which the liquid leaves a tank by gravity flow. One object of the invention is to provide a construction having means for indicating the resistance offered by a column of the liquid being measured to the means for displacing the same. Another object of the invention is the provision of means for preventing fluctuation of the liquid in the indicator gauge. A further object is to provide a gauge in which the transparent tube through which the measured liquid may be seen is comparatively short. Other objects of the invention reside in the novel arrangements and combinations of parts as more fully hereinafter set forth.

In the drawings:

Figure 1 is a longitudinal sectional view partly in elevation of a construction embodying my invention;

Figure 2 is a top plan view of a portion of a tank containing the liquid being measured, and showing the top of that portion of the depth indicating device extending into the tank.

Generally speaking, my device comprises a tube extending into the liquid being measured and having an open end outside the liquid. Means is provided for drawing air into this tube to displace the liquid therein, which liquid in being displaced offers a certain resistance to the column of air displacing the same. A pressure gauge measuring the difference of pressure of air in the tube and in the tank outside the tube discloses the depth or amount of the liquid being measured.

In detail, 1 is a gasoline tank upon an automobile and having the aperture 2 in its top. 3 is a tube extending through the aperture and into the gasoline. The lower end 4 of this tube is open and terminates adjacent to the bottom of the tank 1, suitable projections or ears 5 being provided upon the tube and extending beyond its lower end to engage the bottom of the tank. The space between the lower end 4 of the tube 3 and the bottom of the gasoline tank should be as small as possible and at the same time large enough to allow the free passage of air beneath the tube. 6 is the cover or cap for the tube 3 and engages the top of the tank 1 and seals the opening 2 therein. Suitably secured to the cap 6 is the threaded nipple 7 communicating with the space inside the tube 3 and adapted for connection with the pipe connection 8 leading to one leg of the U-shaped pressure gauge 9. The nipple 10 and the pipe connection 11 connect the other leg of the gauge to the top of the gasoline tank.

For supplying the air to the tube 3 to displace the gasoline therein, the inner tube 12 is provided extending substantially axially of the tube 3 and terminating near the bottom of the tank 1. The lower end 13 of this tube is open while the upper end is secured to the cap 6 and communicates with the threaded nipple 14 secured to the cap. 15 is another threaded nipple secured to the cap 6 and communicating with the interior of the tank 1 outside the tube 3. This threaded nipple is adapted to be connected to a suitable vacuum source, such as the engine intake manifold 16 by the pipe connection 17. The upper end 18 of the tube 12 is open to the air outside the cap 6 and is preferably provided with a suitable screen 19 for preventing the entrance of dust or dirt into the tube.

In operation, when the engine is running the vacuum or partial vacuum in the intake manifold 16 produces a vacuum or partial vacuum in the tank 1, which draws air through the tube 12, which displaces the gasoline in the tube 3 and passes below the lower end of the tube 3 and up into the tank 1. This air with any gasoline vapor in the tank can be drawn through the pipe connection into the intake manifold. The difference of pressure of the air in the tube 3 and the tank 1 outside the tube 3, as measured by the gauge 9, indicates the depth or amount of the gasoline in the tank 1 depending upon the graduations of the gauge scale. The reason for having the pipe connection 8 extending between and communicating with the tube 3 and one leg of the U-gauge 9 is to secure operation of the gauge when the engine is not running. When the engine is running this pipe connection is not necessary.

In order to reduce the fluctuations of the indicating liquid in the gauge 9 the diaphragms 20 are provided in the gauge. In detail, 21 and 22 are cooperating threaded members of a union for connecting each of the legs 23 and 24 of the gauge to the pipe connections 8 and 11 respectively. The diaphragms 20, formed of suitable material through which air passes very slowly, such as kid, are clamped between these cooperating union members, preferably two diaphragms being used, they being separated by a washer 25.

For the purpose of using a relatively short gauge glass 26, through which the level of the indicating liquid 27 in the gauge may be seen, the U-shaped tube 28 is provided which has a leg 29 connected to the bottom of the glass 26 and to the rear thereof, the other leg 30 of the U-tube extending upward to the rear of the gauge glass and connected to the lower cooperating union member 22.

A feature of my invention is the use of acetylene tetra bromide in the gauge 9. This liquid has a high specific gravity (3.0), does not corrode or act on metals in any way. Further, it does not freeze and is not volatile at ordinary air temperature. It is comparatively cheap and easy to manufacture, and it not poison or dangerous to handle.

What I claim as my invention is:

1. In a depth indicating device for liquids, the combination with a tank containing liquid, of a tube communicating with the air outside said tank and extending into and communicating with the liquid in said tank, of means for producing a vacuum in said tank sufficient to draw air into said tube and displace the liquid down to the point of communication of the tube with the liquid, and a pressure indicator connected with said tank.

2. In a depth indicating device for liquids, the combination with a tank containing liquid, of a tube extending into the liquid and communicating therewith at the full depth to be measured, said tube also communicating with the air outside of said tank, of means for drawing air into said tube to completely fill the same and displace the liquid therein, and means for indicating the relative air pressure in said tube and tank.

3. In a depth indicating device for liquids, the combination with a tank containing liquid, of a substantially vertical tube extending into and communicating with the liquid adjacent the bottom of said tank, said tube communicating with the air outside said tank, means connected with said tank above the level of the liquid therein for producing a vacuum to draw air into said tube and displace the liquid therein, and a pressure indicator connected with said tank, the point of connection being above the level of the liquid therein.

4. The combination with a closed tank containing a liquid, of a tube extending into said tank and terminating near the bottom thereof, said tube having an open lower end, a second tube extending longitudinally of said first-mentioned tube and terminating near the lower end thereof, said second tube communicating with the space enclosed by said first mentioned tube, means communicating with the top of said tank outside said first-mentioned tube for creating a vacuum in said tank to draw air through said second mentioned tube to displace the liquid in said first mentioned tube, and a pressure indicator connected with the top of said tank above the level of the liquid therein.

5. The combination with a closed tank containing a liquid, of a device for indicating the depth of the liquid in said tank comprising a tube extending into said tank and terminating near the bottom thereof, said tube having an open lower end, a second tube extending longitudinally within said first mentioned tube and having its lower end terminating near the lower end thereof and communicating with the space enclosed thereby, means for producing a vacuum in said tank to draw air through said second mentioned tube and displace the liquid in said first mentioned tube, and a U-tube having one leg connected with said first mentioned tube and the other leg connected with said tank above the level of the liquid therein.

6. The combination with a tank having an opening in its top, of a tube extending through said opening and having a cap for closing the same, a second tube extending longitudinally of said first mentioned tube having an open end outside said cap and opening into the space enclosed by said first mentioned tube, said second tube secured to said cap, a nipple upon said cap and communicating with said first mentioned tube, a second nipple upon said cap and communicating with said tank at the side of the first mentioned tube, a third nipple upon said cap and communicating with said tank at the side of said first mentioned tube, means connected to said third nipple for producing a vacuum in said tank, and a U-gauge having its legs connected with said first and second mentioned nipples.

7. In a depth indicating device, the combination with a receptacle having air therein, of a gauge communicating with the air in said receptacle, and a diaphragm permeable to air in the communication.

8. In a depth indicating device, the combination with a receptacle having air therein, of an indicator gauge, a pipe connecting into said tank and communicating with the air therein, cooperating members for securing said pipe to said gauge, and a diaphragm permeable to air between said members.

9. In a depth indicating device, the combination of receptacles having air therein at different pressures, of an indicator gauge, comprising a relatively short substantially vertical transparent tube in which the indicating liquid is adapted to rise and lower, the ends of said tube communicating with the air in said receptacles, and a U-tube to the rear of and connected to the lower end of said transparent tube and extending below said end, said U-tube forming a portion of the communications for said lower end.

10. In a depth indicating device for liquids, the combination with a tank containing liquid and a chamber communicating with the liquid at the full depth to be measured and with the air outside said tank, of means for drawing air into said chamber to displace the liquid therein down to the point of communication of said chamber with the liquid in the tank, and a pressure indicator connected with said means.

11. In a depth indicating device for liquids, the combination with a closed tank containing liquid, of a chamber communicating with the air outside said tank and with the liquid in said tank, means for producing a vacuum in said tank sufficient to draw air into said chamber and displace the liquid therein, and means for indicating the difference of air pressure in said chamber and tank respectively.

12. In a depth indicating device for liquids, the combination with a chamber communicating with a liquid at the full depth to be measured and with the air above the level of the liquid, of means for drawing air into the chamber to displace the liquid therein down to the point of communication of said chamber with the liquid, and a pressure indicator connected with said chamber.

13. In a depth indicating device for liquids, the combination with a chamber communicating with a liquid at the full depth to be measured, of a tube in communication with the air above the surface of the liquid and also with said chamber at substantially the same level as said chamber communicates with the liquid, means for drawing air through said tube, and a pressure indicator connected with said chamber.

14. In a depth indicating device for liquids, the combination with a chamber having a closed upper end and an open lower end at the full depth of the liquid to be measured, a tube extending within said chamber and opening thereinto near the lower end thereof, said tube communicating with the air above the surface of the liquid, means for drawing air into said tube, and a pressure indicator connected to said chamber.

In testimony whereof I affix my signature.

HORACE W. KING.